(12) United States Patent  (10) Patent No.: US 8,149,249 B1
Oplinger  (45) Date of Patent: Apr. 3, 2012

(54) FEEDBACK DURING CROSSING OF ZOOM LEVELS

(75) Inventor: Andrew Oplinger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,658

(22) Filed: Sep. 30, 2011

Related U.S. Application Data

(63) Continuation of application No. 12/888,209, filed on Sep. 22, 2010.

(51) Int. Cl.
    *G09G 5/00* (2006.01)
(52) U.S. Cl. ......................................... 345/661
(58) Field of Classification Search ........................ None
    See application file for complete search history.

(56) References Cited

U.S. PATENT DOCUMENTS

| | | | |
|---|---|---|---|
| 7,075,513 | B2 | 7/2006 | Silfverberg et al. |
| 7,184,064 | B2 | 2/2007 | Zimmerman et al. |
| 2005/0116966 | A1 | 6/2005 | Graham et al. |
| 2005/0210399 | A1 | 9/2005 | Filner et al. |
| 2006/0026535 | A1 | 2/2006 | Hotelling et al. |
| 2006/0087520 | A1 | 4/2006 | Ito et al. |
| 2006/0227153 | A1 | 10/2006 | Anwar et al. |
| 2009/0027421 | A1 | 1/2009 | Servan-Schreiber et al. |
| 2009/0040238 | A1 | 2/2009 | Ito et al. |
| 2009/0164937 | A1 | 6/2009 | Alviar et al. |
| 2009/0189920 | A1 | 7/2009 | Chiu et al. |
| 2009/0228828 | A1 | 9/2009 | Beatty et al. |
| 2009/0243998 | A1 | 10/2009 | Wang |
| 2010/0079501 | A1* | 4/2010 | Ikeda et al. ................... 345/661 |
| 2011/0013049 | A1* | 1/2011 | Thorn ......................... 348/240.3 |
| 2011/0102464 | A1* | 5/2011 | Godavari ...................... 345/650 |

FOREIGN PATENT DOCUMENTS

| | | |
|---|---|---|
| EP | 2034399 A2 | 3/2009 |
| WO | 2011046766 A2 | 4/2011 |
| WO | 2011059556 A1 | 5/2011 |
| WO | 2011082154 A1 | 7/2011 |

OTHER PUBLICATIONS

U.S. Appl. No. 12/847,335, by Mark S. Wagner, filed Jul. 30, 2010.
U.S. Appl. No. 13/250,648, by Mark S. Wagner, filed Sep. 30, 2011.
U.S. Appl. No. 12/888,209, by Andrew Oplinger, filed Sep. 22, 2010.

* cited by examiner

*Primary Examiner* — Ryan R Yang
(74) *Attorney, Agent, or Firm* — Shumaker & Sieffert, P.A.

(57) ABSTRACT

Aspects of this disclosure are directed to zooming into or out of image content. A user may request to zoom into or out of image content by inputting a multi-touch gesture. The request may reach one or more discrete zoom levels of a plurality of discrete zoom levels. Discrete zoom levels may indicate specific magnification factors for which a device may be able to clearly render image content. The device may output an indication when the request reaches the one or more discrete zoom levels.

25 Claims, 6 Drawing Sheets

FEEDBACK DURING CROSSING OF ZOOM LEVELS

This application is a continuation of U.S. application Ser. No. 12/888,209 filed Sep. 22, 2010, the entire contents of which is incorporated herewith.

TECHNICAL FIELD

This disclosure relates to zooming into or out of image content displayed on a screen.

BACKGROUND

Devices such as mobile devices and desktop computers are configured to display image content such as documents, e-mails, and pictures on a screen. The devices may allow a user to zoom-in or zoom-out of the displayed image content. Zooming into the image magnifies part of the image content. Zooming out of the image content provides large amounts of displayed image content on a reduced scale.

As one example, to zoom into the image content, the user may place two fingers, e.g., the index finger and thumb, on the screen and move the two fingers further apart. The device may magnify parts of the image content based on the starting point of the two fingers and the amount of distance that the two fingers traversed on the screen when moving apart. As another example, to zoom out of the image content, the user may place two fingers on the screen and move the two fingers together. The device may then provide larger amounts of displayed image content on the reduced scale based on the starting point of the two fingers and the amount of distance that the two fingers traversed on the screen when moving together.

SUMMARY

In one example, aspects of this disclosure are directed to a method comprising receiving a multi-touch gesture input comprising a request to zoom in or zoom out of image content that is displayed using a touch-sensitive surface of a device, determining, during receipt of the multi-touch gesture input using the touch-sensitive surface, whether the request to zoom in or zoom out of the image content has reached one or more discrete zoom levels of a plurality of discrete zoom levels, wherein the one or more discrete zoom levels are between a maximum and a minimum zoom boundary for displaying the image content, and wherein each one of the one or more discrete zoom levels comprises a magnification factor for a stored version of the image content that is zoomed in or zoomed out to that magnification factor, and outputting, by the device, an indication to alert a user when the request reaches the one or more discrete zoom levels.

In another example, aspects of this disclosure are directed to a computer-readable storage medium comprising instructions that cause one or more processors to receive a multi-touch gesture input comprising a request to zoom in or zoom out of image content that is displayed using a touch-sensitive surface of a device, determine, during receipt of the multi-touch gesture input using the touch-sensitive surface, whether the request to zoom in or zoom out of the image content has reached one or more discrete zoom levels of a plurality of discrete zoom levels, wherein the one or more discrete zoom levels are between a maximum and a minimum zoom boundary for displaying the image content, and wherein each one of the one or more discrete zoom levels comprises a magnification factor for a stored version of the image content that is zoomed in or zoomed out to that magnification factor, and output, by the device, an indication to alert a user when the request reaches the one or more discrete zoom levels.

In another example, aspects of this disclosure are directed to a device comprising a touch-sensitive surface that receives a multi-touch gesture input comprising a request to zoom in or zoom out of image content that is displayed using a touch-sensitive surface of the device, means for determining, during receipt of the multi-touch gesture input using the touch-sensitive surface, whether the request to zoom in or zoom out of the image content has reached one or more discrete zoom levels of a plurality of discrete zoom levels, wherein the one or more discrete zoom levels are between a maximum and a minimum zoom boundary for displaying the image content, and wherein each one of the one or more discrete zoom levels comprises a magnification factor for a stored version of the image content that is zoomed in or zoomed out to that magnification factor, and one or more processors that output an indication to alert a user when the request reaches the one or more discrete zoom levels.

Aspects of this disclosure may provide one or more advantages. As one example, the indication when the request reaches the one or more discrete zoom levels may allow the user to more easily zoom in or zoom out to the desired zoom level because the user will know that he or she has reached a discrete zoom level. As another example, the indication when the request reaches the one or more discrete zoom levels may allow the user to stop zooming at a discrete zoom level. As described in more detail below, the device may be able to more clearly display image content that is zoomed to a discrete zoom level compared to image content that is zoomed to a non-discrete zoom level.

The details of one or more aspects of the disclosure are set forth in the accompanying drawings and the description below. Other features, objects, and advantages of the disclosure will be apparent from the description and drawings, and from the claims.

DETAILED DESCRIPTION

Certain aspects of the disclosure are directed to techniques for providing a user of a computing device with an indication (e.g., palpable indication) that he or she is crossing through a zoom level (e.g., when performing multi-touch gestures, such as "pinch" gestures) to zoom in or out of image content displayed on a screen, such as a touch-sensitive screen or surface. An application executing on the device that generated the image content, the device, or one or more external servers may define discrete zoom levels. The zoom levels may define how much the image content should be magnified, and may be considered as magnification factors in some examples. The device may be able to clearly render image content to a user when the user zooms in or out at any of the discrete zoom levels.

Each discrete zoom level may be between a maximum and minimum zoom boundary for displaying the image content. The maximum zoom boundary may be the zoom-in boundary, and the minimum zoom boundary may be the zoom-out boundary. For example, the device may limit the user from zooming in any further than 1600% or zooming out any further than 10% for the displayed image content. In this example, 1600% may be the maximum zoom boundary and 10% may be the minimum zoom boundary. The discrete zoom levels may be between 10% and 1600%, in this example.

Figure 1A:
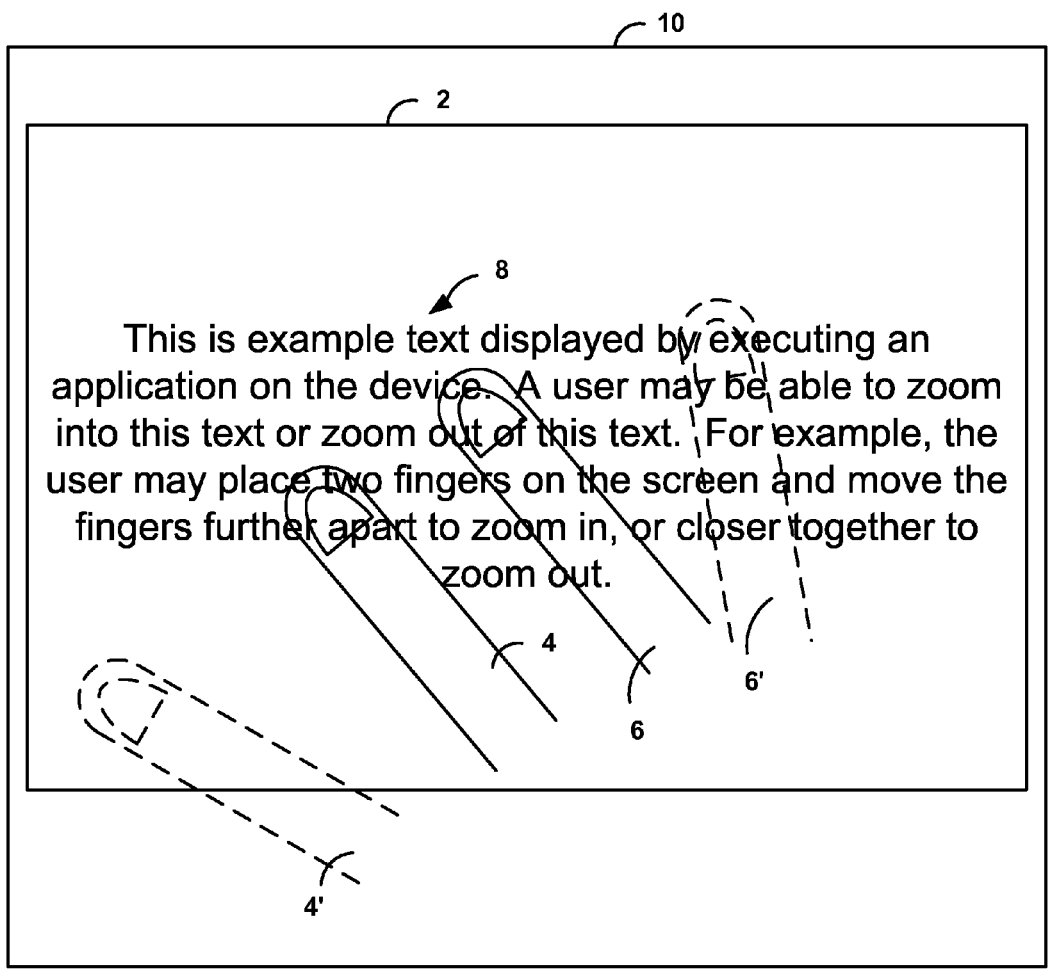
FIG. 1A is a screen illustration of zooming into or out of image content in accordance with one or more aspects of this disclosure.

FIG. 1A is a screen illustration of zooming into or out of image content in accordance with one or more aspects of this disclosure. FIG. 1A illustrates a screen 2 that displays image content 8. Screen 2 may be a touch screen, liquid crystal display (LCD), e-ink, or other display. For purposes of illustration, screen 2 may be a touch screen, and may be considered as a touch-sensitive surface of a device. Screen 2 may be a screen for device 10. Examples of device 10 include, but are not limited to, a portable or mobile device such as a cellular phone, a personal digital assistant (PDA), a laptop computer, a portable gaming device, a portable media player, an e-book reader, a watch, as well as a non-portable device such as a desktop computer.

As illustrated in FIG. 1A, image content 8 may be a document that includes words. However, image content 8 should not be considered limited documents that include words. Image content 8 may be a picture, video, or any other type of image content.

A user of the device that includes screen 2 may desire to zoom into or zoom out of image content 8. Zooming into image content 8 magnifies part of the image content 8. Zooming out of image content 8 provides large amounts of displayed image content 8 on a reduced scale, e.g., shrinks image content 8.

To zoom into or zoom out of image content 8, the user of the device may provide a user gesture input to a user interface of device 10. Examples of the user interface include, but are not limited to, screen 2, itself, in examples where screen 2 is a touch screen, a keyboard, a mouse, one or more buttons, a trackball, or any other type of input mechanism.

A user gesture input, as used in this disclosure, may be considered as any technique to zoom into or zoom out image content, e.g., image content 8. One example of a user gesture input is a multi-touch gesture input. A multi-touch gesture input comprises the user placing at least two input units on the user interface and moving the at least two input units to zoom into or zoom out of image content 8.

For instance, the user may implement the two-finger zoom in or zoom out technique (e.g., pinch zoom) to zoom into or out of the image content. The two-finger zoom in or zoom out technique is one example of a multi-touch gesture input. In this example, each finger may be considers as an input unit. However, aspects of this disclosure are not limited to the input units being fingers. An input unit may include a stylus pen, user's digits, and other similar units.

As illustrated in FIG. 1A, the user may place user digit 4 and user digit 6, in a first position on screen 2. To zoom into image content 8, the user may move user digits 4 and 6 further apart, to a second position on screen 2, as illustrated by user digits 4' and 6'. User digit 4' is the same as user digit 4, however at a different location on screen 2 compared to user digit 4. Similarly, user digit 6' is the same as user digit 6, however at a different location on screen 2 compared to user digit 6. To zoom out of image content 8, the user may move user digits together. For example, the user may place user digit 4 and user digit 6 at the locations of user digit 4' and user digit 6', respectively, and move them together.

User digits 4 and 6 are provided for illustration purposes only and should not be considered as limiting. To zoom into or out of image content 8, the user may utilize techniques other than the two-finger zoom in or zoom out technique. For purposes of illustration, aspects of this disclosure are described in the context of the two-finger zoom in or zoom out technique, but aspects of this disclosure should not be considered limited to the two-finger zoom in or zoom out technique.

The amount that image content 8 is zoomed into or out of may be based on the amount of distance that the user digits move on screen 2. The amount of distance that user digits move on screen 2, and whether the user digits move together or further apart, may correspond to a magnification factor. The magnification factor may define how much image content 8 should be magnified or shrunk. For instance, a magnification factor of 2× may magnify image content 8 by a factor two, whereas a magnification factor of −2× may shrink image content 8 by a factor of two.

As one example, a movement of 0.1 inches, where the user moves user digits 4 and 6 apart, may correspond to a magnification factor of 0.1. Similarly, a movement of 0.1 inches, where the user moves user digits 4 and 6 closer together, may correspond to a magnification factor of −0.1. The ratio of 0.1 inches for every +/−0.1 magnification factor is provided for illustration purposes and should not be considered as limiting. As one example, if the user moved user digits 4 and 6 three inches apart, image content 8 may be magnified by a magnification factor of 3, e.g., 3×. If the user moved user digits 4 and 6 three inches together, image content 8 may be shrunk by a magnification factor of −3, e.g., −3×.

As another example, assume that in FIG. 1, user digits 4 and 6 are one inch apart, in the first position. Also, assume that in FIG. 1, user digits 4' and 6' are three inches apart, in the second position. In this example, user digits 4 and 6 traversed a total of two inches on screen 2. Also, in this example, the user moved user digits 4 and 6 further apart.

Image content 8 may be zoomed into by a magnification factor that corresponds to movement of user digits 4 and 6 by two inches, where the movement moves user digits 4 and 6 further apart, in this example. Image content 8 may be magnified by a factor of two because in this example for each 0.1 inch of movement, image content 8 is magnified by a magnification factor of 0.1.

The user may provide a request to zoom in or zoom out of image content 8 with a multi-touch gesture input on screen 2, e.g., a touch-sensitive surface of a device, at different magnification factors. For instance, device 10 may receive a multi-touch gesture input comprising a request to zoom in or zoom out of image content 8 using a touch-sensitive surface, e.g., screen 2, of device 10. For example, the user may request to zoom into image content 8 with a magnification factor of 2.8× or zoom out of image content 8 with a magnification factor of −0.8×. In some examples, zoomed in or zoomed out versions of image content 8 at all possible magnification factors may not be available. For example, device 10, or some external server, may not store zoomed in or zoomed out versions of image content 8 at all possible magnification factors.

In some examples, device 10, or some external server, may store zoomed in or zoomed out versions of image content 8 at discrete zoom levels between a maximum and a minimum zoom boundary of image content 8. Each discrete zoom level may be for specific magnification factors. For example, device 10, or the external server, may store zoomed in versions of image content 8 at magnification factors of 2×, 3×, 4×, and so forth, up to 10×, and magnification factors of −2×, −3×, −4×, and so forth, down to −10×.

In this example, a magnification factor of 2× may be one discrete zoom level, a magnification factor of 3× may be another discrete zoom level, and so forth. Also, in this example, a magnification factor 10× may be the maximum zoom boundary because it may not be possible to zoom into, e.g., magnify, image content 8 by more than a magnification factor of 10×. In this example, a magnification factor −10× may be the minimum zoom boundary because it may not be possible to zoom out of, e.g., shrink, image content 8 by more than a magnification factor of −10×.

The examples of the discrete zoom levels are provided for illustration purposes only. The discrete zoom levels need not be limited to integer values, and may not need increase or decrease in fixed amounts. For example, the magnification factor of a first discrete zoom level may be 2.3×, the magnification factor of a second discrete zoom level may be 3.5×, and the magnification factor of a third discrete zoom level may be 5.4×. Also, the examples of the maximum and minimum zoom boundaries are provided for illustration purposes. The maximum and minimum zoom boundaries may be greater than or less than 10× and −10×, respectively.

Device 10, or the external sever, may not store zoomed in or zoomed out versions of image content 8 at magnification factors other than magnification factors at the discrete zoom levels. As one example, device 10 may not store a zoomed in version of image content 8 at a magnification factor of 4.3×, but may store a zoomed in version of image content 8 at magnification factors 4× and 5×. In this example, magnification factors 4× and 5× may each be a discrete zoom level. As another example, the external server may not store a zoomed out version of image content 8 at a magnification factor of −2.7×, but may store a zoomed out version of image content 8 at magnification factors −2.5× and −3×. In this example, magnification factors −2.5× and −3× may each be a discrete zoom level.

As described above, device 10 may receive a request to zoom in or zoom out of image content 8 with a multi-touch gesture input on screen 2. In some examples of this disclosure, device 10 may determine, during receipt of the multi-touch gesture input, whether the request to zoom in or zoom out of the image content has reached one or more discrete zoom levels of a plurality of discrete zoom levels. The one or more discrete zoom levels may be within the maximum and minimum zoom boundaries. Device 10 may output an indication when the request reaches one or more discrete zoom levels of a plurality of discrete zoom levels. The indication may alert to the user that he or she has reached a discrete zoom level.

For example, while the user is moving user digits 4 and 6 further apart, the user may move user digits 4 and 6 by 1.5 inches. Movement by 1.5 inches may correspond to a magnification factor of 1.5×. A magnification factor of 1.5× may be a magnification factor for a first discrete zoom level. In this example, device 10 may output an indication when the request reaches a distance of 1.5 inches, e.g., traverses a distance of 1.5 inches on screen 2. The user may not stop after moving user digits 4 and 6 by 1.5 inches and may keep moving them to 2 inches. Movement by 2 inches may correspond to a magnification factor of 2×. A magnification factor of 2× may be a magnification factor for a second discrete zoom level. In this example, device 10 may output an indication when the request reaches a distance of 2 inches, e.g., traverses a distance of 2 inches on screen 2, and so forth for one or more discrete zoom levels.

One example of the indication that is outputted by device 10 when the request reaches a discrete zoom level, during receipt of the multi-touch gesture input, may be a physical indication. For example, when the request to zoom in or zoom out of image content 8 reaches one or more discrete zoom levels, device 10 may vibrate to output the indication that of device 10. Device 10 may vibrate for 2 milliseconds, as one non-limiting example.

Figure 1B:
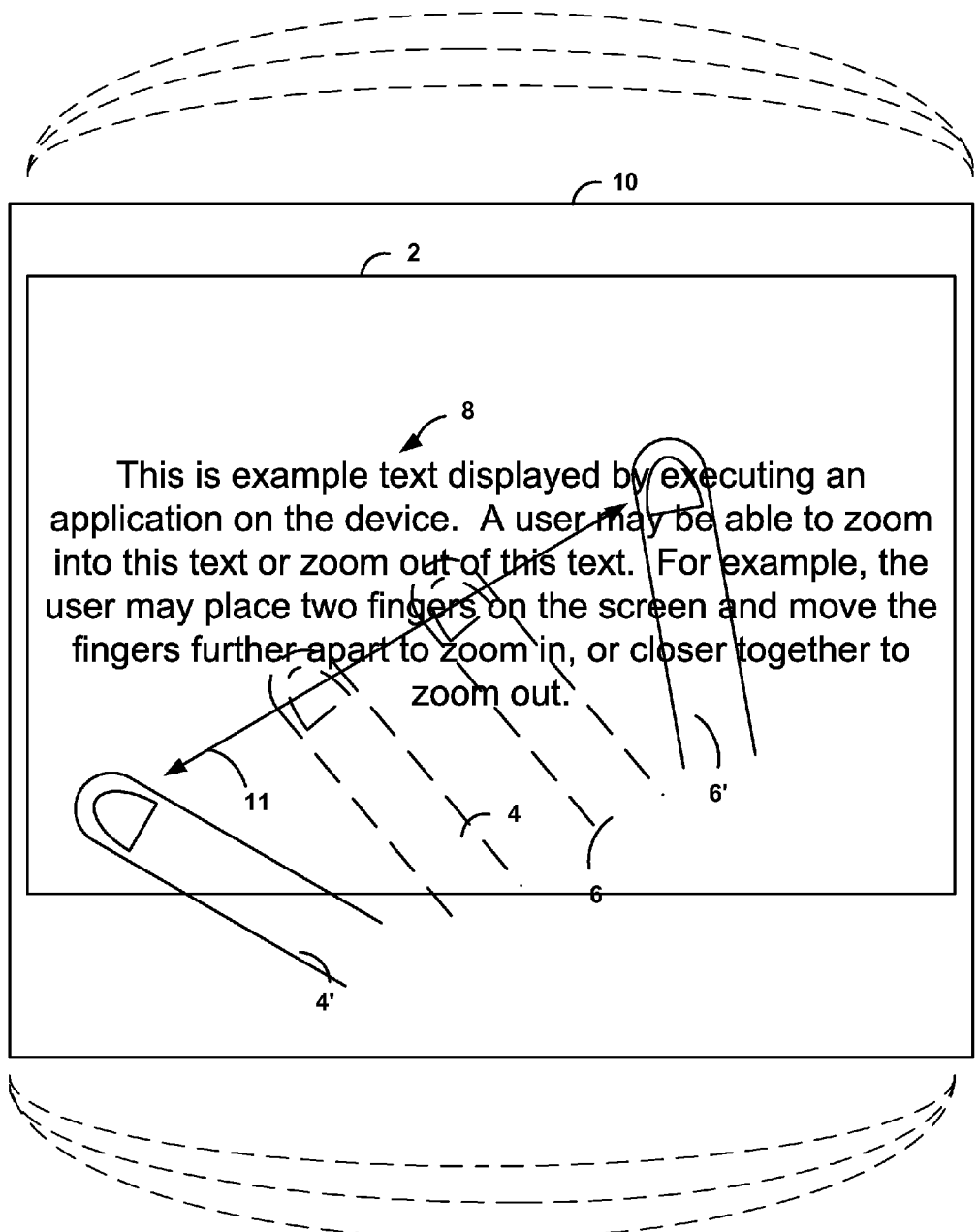
FIG. 1B is a screen illustration of outputting an indication to alert a user when a request reaches one or more discrete zoom levels.
Figure 4:
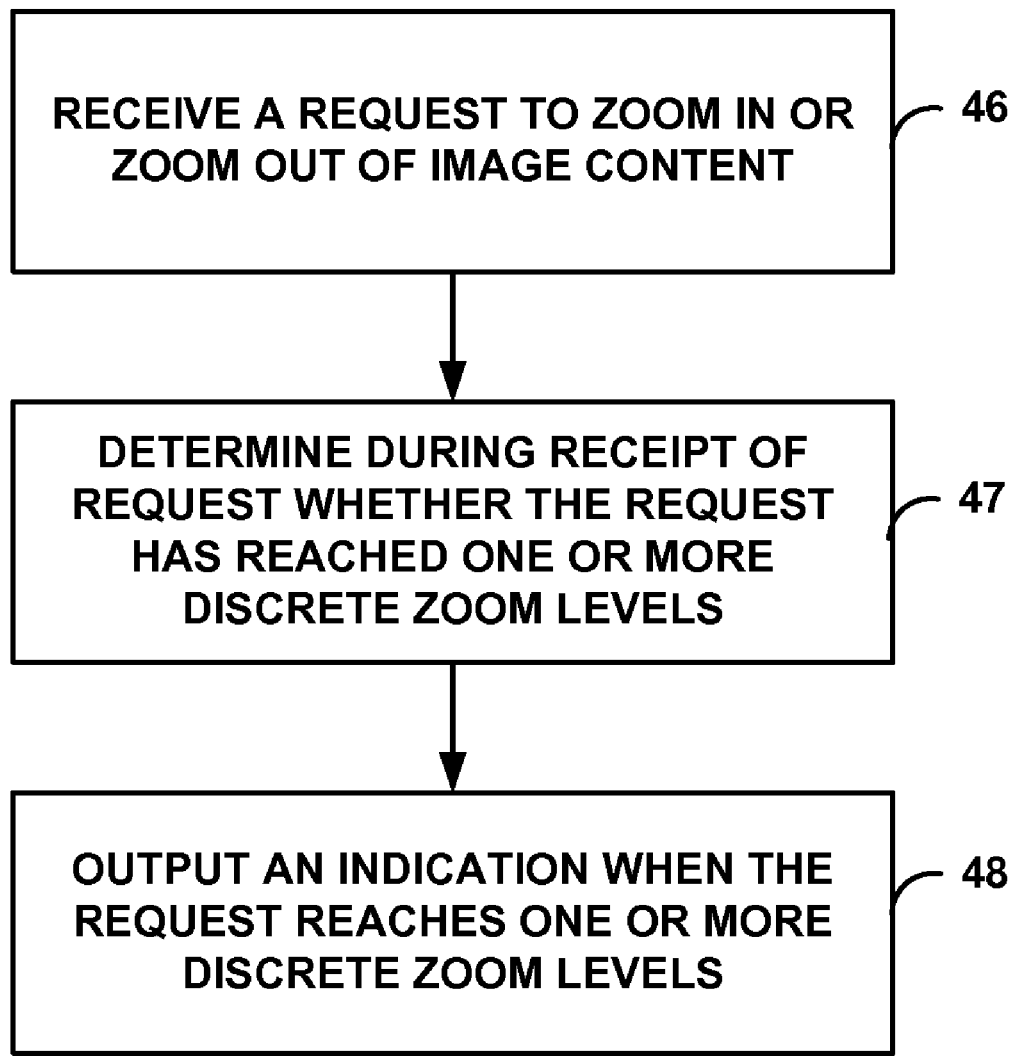
FIG. 4 is a flowchart illustration of an example operation of a device, in accordance with one or more aspects of this disclosure.

For example, FIG. 1B is a screen illustration of outputting an indication to alert a user when a request reaches one or more discrete zoom levels. As illustrated in FIG. 1B, the user may have moved fingers 4 and 6 from their location in FIG. 1A, to locations 4' and 6'. In the example of FIG. 1B, FIGS. 4 and 6 may have moved apart by distance 11. Movement by distance 11 inches may correspond to a magnification factor for a discrete zoom level. In this example, device 10 may output an indication when the request reaches distance 11, e.g., the multi-touch gesture input request traverses distance 11 on screen 2. In the example of FIG. 1B, to alert the user that his or her request reached a discrete zoom level, device 10 may output a physical indication, as one non-limiting example. For example, the dashed lines emanating from device 10 may indicate that device 10 is vibrating.

Referring back to FIG. 1A, another example of the indication that is outputted by device 10 when the request reaches a discrete zoom level, during receipt of the multi-touch gesture input, may be a visual indication. For example, when the request to zoom in or zoom out of image content 8 reaches one or more discrete zoom levels, device 10 may change the color of screen 8. As another example, when the request to zoom in or zoom out of image content 8 reaches one or more discrete zoom levels, device 10 may cause screen 2 to display the magnification factor of that discrete zoom level. For instance, when the request reaches a discrete zoom level and the magnification factor for that discrete zoom level is −3.5×, screen 2 may display −3.5× to the user. In this manner, the user may be aware of the amount by which he or she is zooming into or zooming out of image content 8.

Another example of the indication that is outputted by device 10 when the request reaches a discrete zoom level, during receipt of the multi-touch gesture input, may be an audio indication. For example, when the request to zoom in or zoom out of image content 8 reaches one or more discrete zoom levels, device 10 may output a particular sound, e.g., a "boing" sound. In some examples, the sound outputted by device 10 may be different for each discrete zoom level. For instance, the magnification factor for the zoom level may be −2×. When the user moves user digits 4 and 6 together by two inches, device 10 may output an audio indication that sounds like "shrinking by a factor of two," as one non-limiting example, and so forth for one or more discrete zoom levels.

The various physical, visual, and audio indications are provided for illustration purposes and should not be considered as limiting. Aspects of this disclosure may utilize any physical, visual, or audio indication to output an indication when the request to zoom in or zoom out reaches the one or more discrete zoom levels, during receipt of the multi-touch gesture input. Furthermore, in some examples, device 10 may provide multiple indications simultaneously when the request to zoom in or zoom out reaches the one or more discrete zoom levels. For example, when the request to zoom in or zoom out reaches a discrete zoom level, device 10 may output a physical and visual indication simultaneously. There may be other permutations and combinations of providing the indications, and aspects of this disclosure may utilize any permutation and combination to output the indication or indications.

Aspects of this disclosure may provide one or more advantages. As described above, device 10, or the external server, may store zoomed in or zoomed out versions of image content 8 at discrete zoom levels. When a user zooms in or zooms out to a particular discrete zoom level, device 10 may retrieve image content 8 that is zoomed into or out of for that particular discrete zoom level and present image content 8. For example, device 10 may retrieve image content 8 that is zoomed into or out of for that particular discrete zoom level from a storage device within device 10. As another example, device 10 may transmit a request to the external server for image content 8 at that particular discrete zoom level. The external server may then transmit image content 8 for that particular zoom level, and device 10 may present image content 8.

However, in some instances, the user may attempt to zoom into or zoom out of image content 8 at a magnification factor that does not correspond to any of the discrete zoom levels. When a user zooms into or out of image content 8 at a magnification factor that does not correspond to one of the discrete zoom levels, device 10 may not, in some cases, be able to clearly render image content 8 for that magnification factor to the user. For example, when a user selects a magnification factor that does not correspond to any of the discrete zoom levels, device 10 may interpolate image content 8 to display image content 8 for the selected magnification factor. However, even with interpolation, image content 8 at the selected magnification factor may not be clear when displayed to a user.

The user may not realize that he or she is selecting a magnification factor that does not correspond to a discrete zoom level when zooming into or out of image content 8. Accordingly, in some instances, it may be possible for the user to select a magnification factor that does not correspond to a discrete zoom level. The resulting interpolated image content may not be clear, which may be frustrating to the user.

As described above, device 10 may output an indication to alert a user when the request to zoom in or zoom out reaches one or more discrete zoom levels. In this manner, device 10 may allow the user to more easily zoom in or zoom out to the desired magnification factor because the user will know that he or she has reached a discrete zoom level. Also, the user may stop zooming in or zooming out at discrete zoom levels when the user receives the indication that the request to zoom in or zoom out has reached one or more discrete zoom levels. Device 10 may be able to more clearly display image content 8 that is zoomed into or out of to a discrete zoom level compared to when the request to zoom into or out of image content 8 is at a non-discrete zoom level.

Figure 2:
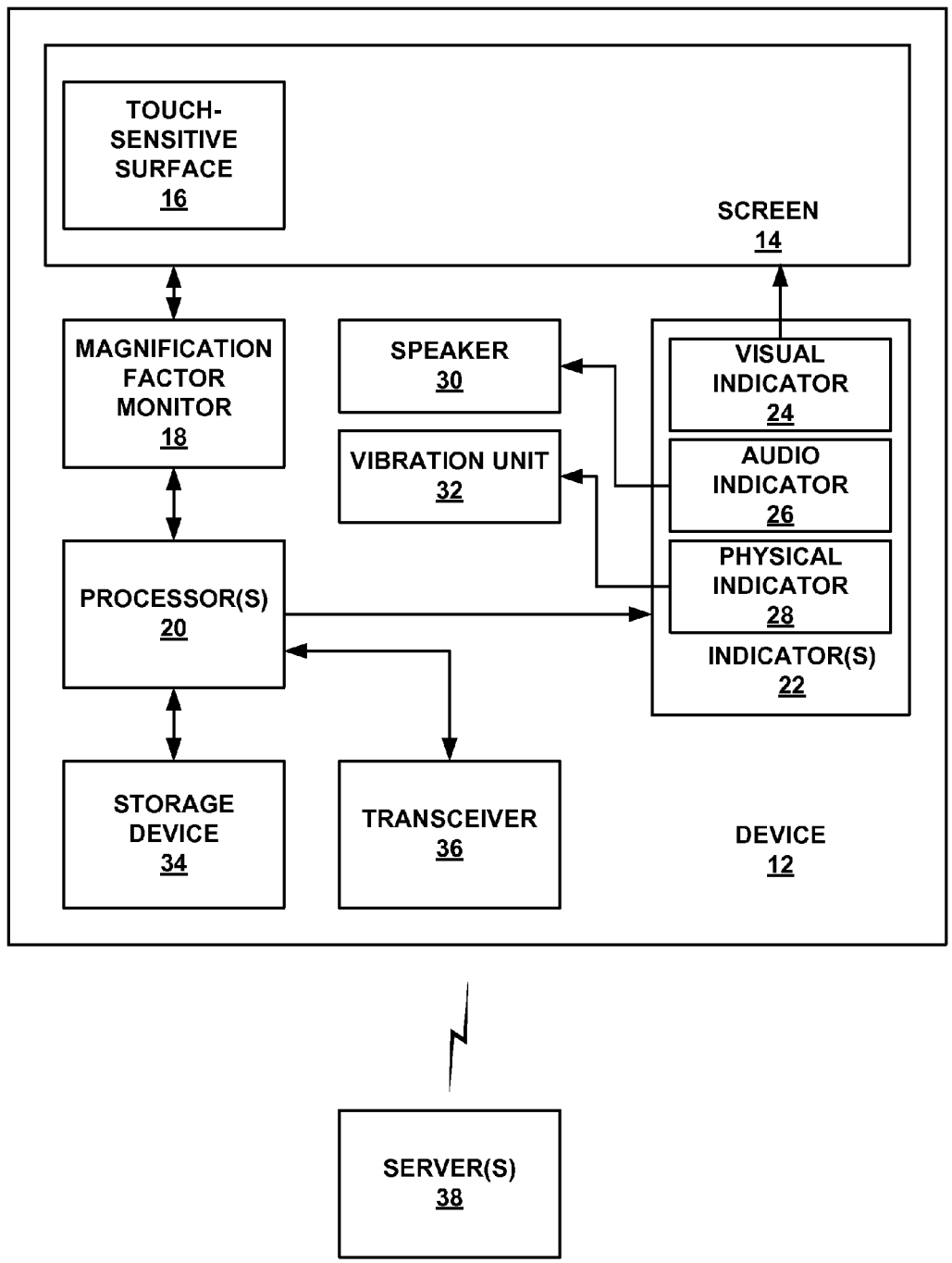
FIG. 2 is a block diagram illustrating an example of a device, in accordance with one or more aspects of this disclosure.

FIG. 2 is a block diagram illustrating an example of a device, in accordance with one or more aspects of this disclosure. FIG. 2 illustrates device 12. Device 12 may be substantially similar to device 10 (FIGS. 1A and 1B). Examples of device 12 include, but are not limited to, a portable or mobile device such as a cellular phone, a personal digital assistant (PDA), a laptop computer, a portable gaming device, a portable media player, an e-book reader, a watch, as well as a non-portable device such as a desktop computer.

Device 12 may include screen 14, magnification factor monitor 18, one or more processors 20, one or more indicators 22, speaker 30, vibration unit 32, storage device 34, and transceiver 36. Device 12 may include additional components not shown in FIG. 2 for purposes of clarity. For example, device 12 may also include a microphone, in addition to speaker 30, to effectuate telephonic communication, in examples where device 12 is a cellular phone. Device 12 may also include a battery that provides power to the components of device 12. Device 12 may also include a user interface such as a keypad, trackball, mouse, or other such user interfaces that allow the user to interact with device 12. Moreover, the components of device 20 shown in FIG. 2 may not be necessary in every example of device 12.

Although shown as separate components, in some examples, magnification factor monitor 18, one or more indicators 22, and one or more processors 20 may be formed in a common hardware unit. In some examples, one or more indicators 22 and magnification factor monitor 18 may be software units that are executed on one or more processors 20.

Screen 14 may be substantially similar to screen 2 (FIG. 1). Examples of screen 14 include, but are not limited to, a touch screen, a liquid crystal display (LCD), an e-ink, or other display. Screen 14 presents the content of device 12 to the user. For example, screen 14 may present at least some or all of the applications executed on device 12 such as an application to display a document, a web browser or a video game, content retrieved from external servers, and other functions that may need to be presented.

As shown in FIG. 2, screen 14 may include touch-sensitive user interface 16. Touch-sensitive user interface 16 may be the interface that receives the user gesture, e.g., the multi-touch gesture input comprising a request to zoom in or zoom out of image content. Although touch-sensitive user interface 16 is shown as encompassing a portion of screen 14, aspects of this disclosure are not so limited. In some examples, touch-sensitive user interface 16 may encompass the entirety of screen 14. In these examples, screen 14 and touch-sensitive user interface 16 may be considered as being the same because all of screen 14 is responsive to the user's touches. In some examples, touch-sensitive user interface 16 may be outside of screen 14.

One or more processors 20 may execute one or more applications to generate image content, such as image content 8 (FIG. 1). One or more processors 20 may display the image content on screen 14. One or more processors 20 may include any one or more of a microprocessor, a controller, a digital signal processor (DSP), an application specific integrated circuit (ASIC), a field-programmable gate array (FPGA), or equivalent discrete or integrated logic circuitry. One or more processors 20 may execute applications stored on storage device 34, in some examples. For ease of description, aspects of this disclosure are described in the context of a single processor 20. However, it should be understood that aspects of this disclosure described with a single processor 20 may be implemented in one or more processors.

The user of user device 12 may input a user gesture, such as the multi-touch gesture, with touch-sensitive surface 16 to request zooming into or out of image content. For example, the user may implement the two-finger zoom in or zoom out technique by placing digits 4 and 6 (FIG. 1) on touch-sensitive surface 16, and moving digits 4 and 6 either together or apart. In this manner, the user may zoom into or zoom out of the image content generated by processor 20.

Magnification factor monitor 18 may be configured to detect the user gesture. For instance, magnification factor monitor 18 may determine where the user placed digits 4 and 6, by how much the user is moving digits 4 and 6 (e.g., the distance traversed on touch-sensitive surface 16), and whether the user is moving digits 4 and 6 together or apart. Magnification factor monitor 18 may calculate the magnification factor based on the movement of user digits 4 and 6, during the user gesture.

In some examples, the ratio of distance traversed to magnification factor may be 1:1, or 1:−1 based on whether user digits 4 and 6 are moving together or apart. However, aspects of this disclosure are not limited to a ratio of 1:1 or 1:−1, and the ratio may be different. For instance, assuming the ratio is 1:1 or 1:−1, for every 0.1 inches traversed by digits 4 and 6, as determined by magnification factor monitor 18, magnification factor monitor 18 may calculate the magnification factor as 0.1× or −0.1×.

For example, if user digits 4 and 6 traversed a distance of two inches, and where moving apart, after user digits 4 and 6 move 0.1 inches, magnification factor monitor 18 may calculate the magnification factor as 0.1×, after user digits 4 and 6 move another 0.1 inches (for a total of 0.2 inches), magnification factor monitor 18 may calculate the magnification factor as 0.2×, until the magnification factor is 2× because user digits 4 and 6 traversed a distance of two inches and moved further apart. Similarly, if user digits 4 and 6 moved closer together for a total distance of two inches, for every 0.1 inches that user digits 4 and 6 moved closer together, magnification factor monitor 18 may calculate the magnification factor as −0.1×, until the magnification factor is 2×. In this manner, magnification factor monitor 18 may determine the magnification factor during the request to zoom in or zoom out of the image content.

Aspects of this disclosure are not limited to magnification factor monitor 18 calculating the magnification factor in increments of 0.1. Magnification factor monitor 18 may calculate the magnification factor in increments different than 0.1.

Magnification factor monitor 18 may transmit the magnification factor, after it is calculated, to processor 20. For example, magnification factor monitor 18 may transmit the magnification factors in increments of 0.1×. In examples where magnification factor monitor 18 calculates the magnification factor in increments other than 0.1×, magnification factor monitor 18 may transmit the magnification factors in increments other than 0.1×.

Processor 20 may receive the magnification factor from magnification factor monitor 18. Processor 20 may then determine, during receipt of the multi-touch gesture input, whether the request to zoom in or zoom out of the image content has reached one or more discrete zoom levels of a plurality of discrete zoom levels. For instance, processor 20 may determine whether the received magnification factor corresponds to a discrete zoom level. In this manner, processor 20 may determine whether, during receipt of the multi-touch gesture input, the request to zoom in or zoom out of the image content reached one or more discrete zoom levels. For example, storage device 34 may store magnification factors for each one of a plurality of discrete zoom levels, as illustrated in more detail in FIG. 3. In this example, processor 20 may receive the magnification factor from magnification factor monitor 18 and determine whether the received magnification factor corresponds to a discrete zoom level stored in storage device 34.

If the received magnification factor corresponds to a discrete zoom level, processor 20 may cause one or more indicators 22 to output an indication to alert a user that the request to zoom into or zoom out of the image content reached a discrete zoom level. In some examples, processor 20 may also transmit the magnification factor, which corresponds to the discrete zoom level, to one or more indicators 22. In response, one or more indicators 22 may output one or more of a visual indication, an audio indication, and/or a physical indication that indicates that that the request to zoom into or zoom out of the image content reached a discrete zoom level.

One or more indicators 22 may include visual indicator 24, audio indicator 26, and physical indicator 28. Visual indicator 24 may provide a visual indication that the request to zoom into or zoom out of the image content reached a discrete zoom level. For example, visual indicator 24 may change the color of screen 14 to output the indication. As another example, visual indicator 24 may change the color of the image content to output the indication. As yet another example, visual indicator 24 may cause screen 14 to display the magnification factor of the discrete zoom level. The above examples are provided for illustration purposes, and should not be considered limiting.

Audio indicator 26 may provide an audio indication that the request to zoom into or zoom out of the image content reached a discrete zoom level. For example, audio indicator 26 may cause speaker 30 to output a sound when the request to zoom into or zoom out of the image content reached a discrete zoom level. The sound may be a "boing" sound, as one example, although the sound need not be limited to the "boing" sound. As another example, audio indicator 26 may cause speaker 30 to output the actual magnification factor of the discrete zoom level. For example, speaker 30 may output "at magnification factor of three," "magnifying by a factor of two and a half," or "shrinking by a factor of one point two," as a few non-limiting examples. In the previous example, magnification factors of 3×, 2.5×, and 1.2× may be magnification factors of discrete zoom levels.

Physical indicator 28 may provide a physical indication that the request to zoom into or zoom out of the image content reached a discrete zoom level. For example, physical indicator 28 may cause vibration unit 32 to vibrate device 12 when the request to zoom into or zoom out of the image content reached a discrete zoom level. Vibration unit 32 may vibrate device 12 for two milliseconds, as one non-limiting example, although vibration unit 32 may vibrate device 12 for more than or fewer than two milliseconds. Vibration unit 32 is provided for illustration purposes only and should not be considered limiting. Physical indicator 28 may output any physical indication to indicate that the request to zoom into or zoom out of the image content reached a discrete zoom level.

In some examples, after the user completes the user gesture to zoom into or zoom out of the image content, processor 20 may display the zoomed in or zoomed out version of the image content. In some examples, storage device 34 may store zoomed in or zoomed out versions of the image content at the discrete zoom levels. If the user stopped the user gesture to zoom into or zoom out of the image content at a discrete zoom level, processor 20 may retrieve the image content, at that zoom level, from storage device 34. Processor 20 may then display the image content on screen 12.

If, however, the user stopped the user gesture to zoom into or zoom out of the image content at a non-discrete zoom level, processor 20 may retrieve the image content, at a zoom level that is closest to the non-discrete zoom level, from storage device 34. Processor 20 may then interpolate the image content from the image content at the zoom level to generate the image content at the non-discrete zoom level. Processor 20 may then display the image content on screen 12.

In some examples, rather than storage device 34 storing zoomed in or zoomed out versions of the image content at the discrete zoom levels, one or more servers 38, that are external to device 12, may store zoomed in or zoomed out versions of the image content at the discrete zoom levels. In these examples, if the user stopped the user gesture to zoom into or zoom out of the image content at a discrete zoom level, processor 20 may retrieve the image content, at that zoom level, from one or more servers 38. Processor 20 may then display the image content on screen 12.

If, however, the user stopped the user gesture to zoom into or zoom out of the image content at a non-discrete zoom level, processor 20 may retrieve the image content, at a zoom level that is closest to the non-discrete zoom level, from one or more servers 38. Processor 20 may then interpolate the image content from the image content at the zoom level to generate the image content at the non-discrete zoom level. Processor 20 may then display the image content on screen 12.

To retrieve the image content from one or more servers 38, processor 20 may cause transceiver 36 to transmit a request to one or more servers 38 for the image content. One or more servers 38 may then transmit the requested image content to transceiver 36, and transceiver 36 may transmit the requested image content to processor 20.

Transceiver 36 is configured to transmit data to and receive data from one or more servers 38. Transceiver 36 may support wireless or wired communication, and includes appropriate hardware and software to provide wireless or wired communication. For example, transceiver 36 may include an antenna, modulators, demodulators, amplifiers, and other circuitry to effectuate communication between device 12 and one or more servers 38.

Figure 3:
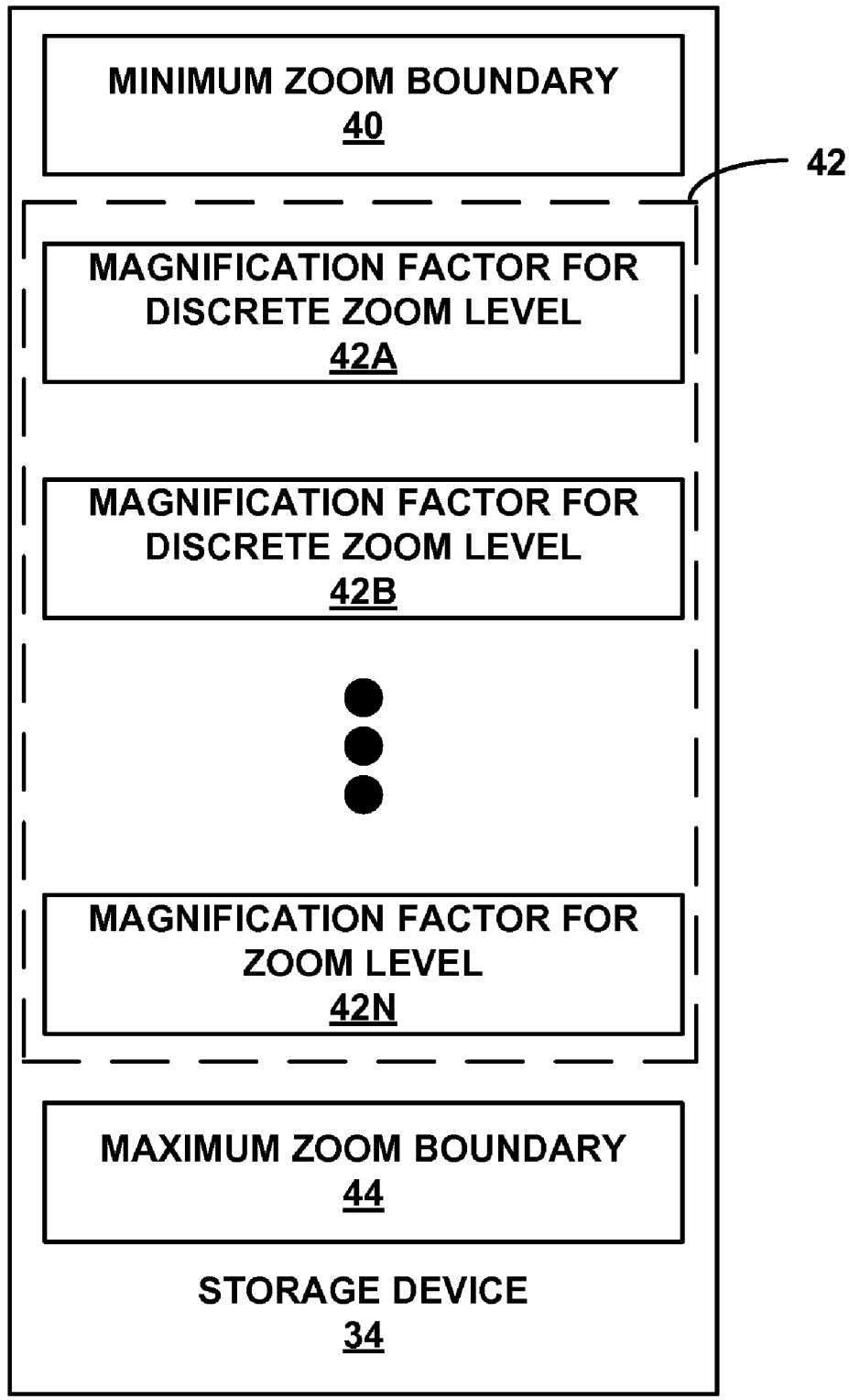
FIG. 3 is a block diagram illustrating a storage device, in accordance with one or more aspects of this disclosure.

FIG. 3 is a block diagram illustrating a storage device, in accordance with one or more aspects of this disclosure. FIG. 3 illustrates storage device 34 (FIG. 2) in more detail. Storage device 34 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

Storage device 34 may, in some examples, be considered as a non-transitory storage medium. The term "non-transitory" may indicate that the storage medium is not embodied in a carrier wave or a propagated signal. However, the term "non-transitory" should not be interpreted to mean that storage device 34 is non-movable. As one example, storage device 34 may be removed from device 12, and moved to another device. As another example, a storage device, substantially similar to storage device 34, may be inserted into device 12. In certain examples, a non-transitory storage medium may store data that can, over time, change (e.g., in RAM).

In some examples, storage device 34 may store one or more instructions that cause one or more processors 20, magnification factor monitor 18, and indicator 22 to perform various functions ascribed to one or more processors 20, magnification factor monitor 18, and indicator 22. Storage device 34 may be considered as a computer-readable storage media comprising instructions that cause one or more processors 20, magnification factor monitor 18, and indicator 22 to perform various functions.

As illustrated in FIG. 3, storage device 34 may store minimum zoom boundary 40 and maximum zoom boundary 44. Minimum zoom boundary 40 may define a zoom out boundary. Processor 20 may not allow the image content, displayed on screen 14, to be zoomed out more than the minimum zoom boundary 40. Maximum zoom boundary 44 may define a zoom in boundary. Processor 20 may not allow the image content, displayed on screen 14, to be zoomed in more than the maximum zoom boundary 44.

For example, the magnification factor of minimum zoom boundary 40 may be −10×, and the magnification factor of maximum zoom boundary 44 may be 10×. In this example, the image content may not be zoomed into or out of by more than 10× and −10×, respectively. The discrete zoom levels may be within minimum zoom boundary 40 and maximum zoom boundary 44. For example, the magnification factors for each of the discrete zoom levels may be greater than −10× (e.g., minimum zoom boundary 40) and less than 10× (e.g., maximum zoom boundary 44).

As illustrated in FIG. 3, storage device 34 may store magnification factors for a plurality of discrete zoom levels 42, e.g., discrete zoom levels 42A-42N. The magnification factors for discrete zoom levels 42A-42N may be between the magnification factors of minimum zoom boundary 40 and maximum zoom boundary 44. As illustrated in FIG. 3, each one of the discrete zoom levels comprises a magnification factor, e.g., one of magnifications factors for discrete zoom levels 42. The magnification factors may be for stored versions of the image content that is zoomed in or zoomed out to that magnification factor. As one non-limiting example, the magnification factor for discrete zoom level 42A may be −9×, the magnification factor for discrete zoom level 42B may be −8×, and the magnification factor for discrete zoom level 42N may be 9×. In this example, one or more of servers 38 may store the image content for the magnification factor of −9× for discrete zoom level 42A. In this example, one or more servers 38 may also store the image content for the magnification factor of −8× for discrete zoom level 42B, and so forth.

As described above, processor 20 may determine whether the received magnification factor, from magnification factor monitor 18, corresponds to a discrete zoom level. Processor 20 may compare the received magnification factor with the magnification factors for discrete zoom levels 42A-42N. If the received magnification factor is substantially similar to one of the magnification factors for discrete zoom levels 42A-42N, processor 20 may cause indicator 22 to output an indication that the request to zoom in or zoom out of the image content reached at least one of the discrete zoom levels 42A-42N.

FIG. 4 is a flowchart illustration of an example operation of a device, in accordance with one or more aspects of this disclosure. A request to zoom in or zoom out of image content may be received (46). For example, a multi-touch gesture input may be received that comprises a request to zoom in or zoom out of the image content that is displayed using a touch-sensitive surface of the device.

A determination may be made during receipt of the multi-touch gesture input of whether the request has reached one or more discrete zoom levels (47). The one or more discrete zoom levels may be within a maximum and a minimum zoom boundary. Each one of the one or more discrete zoom levels may comprise a magnification factor for a stored version of the image content that is zoomed in or zoomed out to that magnification factor. For example, magnification factor monitor 18 may determine the magnification factors during receipt of the multi-touch gesture input and transmit the magnification factors to processor 20. Processor 20 may then compare to the received magnification factors to the magnifications factors of discrete zoom levels stored in storage device 34 to determine whether the request has reached one or more discrete zoom levels during receipt of the multi-touch gesture input.

An indication when the request reaches the one or more discrete zoom levels may be outputted (48). For example, a visual indication, an audio indication, and/or a physical indication may be outputted when the request reaches the one or more discrete zoom levels. The indication may alert the user when the request reaches the one or more discrete zoom levels.

Figure 5:
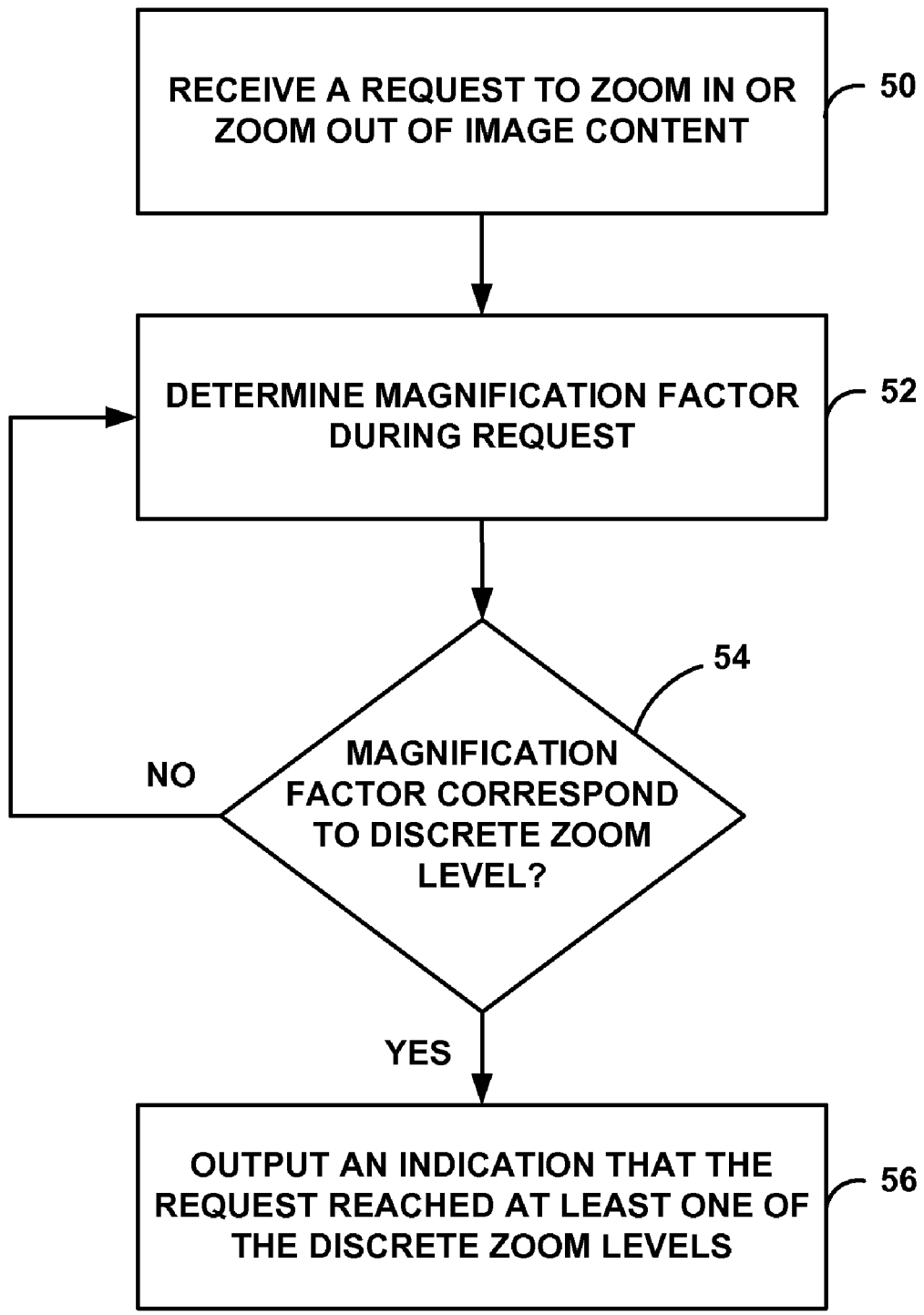
FIG. 5 is a flowchart illustration of another example operation of a device, in accordance with one or more aspects of this disclosure.

FIG. 5 is a flowchart illustration of another example operation of a device, in accordance with one or more aspects of this disclosure. Similar to FIG. 4, a request to zoom in or zoom out of image content may be received (46). The magnification factor may be determined during the request (52). For example, for every increment of 0.1 inches in the request, the magnification factor may be determined based on a 1:1 or 1:−1 ratio. For example, if the request is to zoom out, for every increment of 0.1 inches in the request to zoom out, the magnification factor may be determined to be −0.1×. If the request is to zoom in, for every increment of 0.1 inches in the request to zoom in, the magnification factor may be determined to be 0.1×. A ratio of 1:1 or 1:−1 is provided for illustration purposes, and should not be considered as limiting. Increments of 0.1 inches are provided for illustration purposes and should not be considered as limiting.

A determination of whether the magnification factor corresponds to a discrete zoom level may be made (54). The discrete zoom level may be a discrete zoom level of a plurality of discrete zoom levels. The discrete zoom level may be within a maximum and minimum zoom boundary. For example, a comparison may be made between the magnification factor and magnification factors of discrete zoom levels. If the magnification factor is substantially the same as the magnification factor of a discrete zoom level, a determination may be made that the request is at a discrete zoom level, and that the magnification factor corresponds to a discrete zoom level. If the magnification factor is not substantially the same as the magnification factor of a discrete zoom level, a determination may be made that the request is at a non-discrete zoom level, and that the magnification factor does not correspond to a discrete zoom level.

If a determination is made that the magnification factor does not correspond to a discrete zoom level ("NO" branch of 54), the magnification factor may be determined during the request (52). If a determination is made that the magnification factor corresponds to a discrete zoom level ("YES" branch of 54), an indication that the request reached at least one of the discrete zoom levels may be outputted (56).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may comprise a computer data storage medium such as RAM, ROM, NVRAM, EEPROM, FLASH memory, magnetic or optical data storage media, and the like. The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
receiving a multi-touch gesture input comprising a request to zoom in or zoom out of image content that is displayed using a touch-sensitive surface of a device;
determining, during receipt of the multi-touch gesture input using the touch-sensitive surface, whether the request to zoom in or zoom out of the image content has reached one or more discrete zoom levels of a plurality of discrete zoom levels, wherein the one or more discrete zoom levels are between a maximum and a minimum zoom boundary for displaying the image content, and wherein each one of the one or more discrete zoom levels comprises a magnification factor for a stored version of the image content that is zoomed in or zoomed out to that magnification factor; and
outputting, by the device, an indication to alert a user when the request reaches the one or more discrete zoom levels.

2. The method of claim 1, further comprising:
determining one or more magnification factors during the receipt of the request; and
determining whether the one or more magnification factors correspond to the one or more discrete zoom levels,
wherein outputting the indication comprises outputting the indication when the request reaches the one or more discrete zoom levels based on the determination of whether the one or more magnification factors correspond to the one or more discrete zoom levels.

3. The method of claim 2, wherein determining the one or more magnification factors during receipt of the request comprises determining the one or more magnification factors during increments of the request.

4. The method of claim 2, further comprising:
determining a distance traversed by the multi-touch gesture input,
wherein determining the one or more magnification factors during the receipt of the request comprises determining the one or more magnification factors during receipt of the request based on the distance traversed by the multi-touch gesture input.

5. The method of claim 4, wherein determining the distance traversed by the multi-touch gesture input comprises determining a distance that two fingers moved in providing the multi-touch gesture input.

6. The method of claim 1, wherein receiving the request to zoom in or zoom out of image content comprises receiving the request to zoom in or zoom out of image content with a two-finger touch technique.

7. The method of claim 1, wherein outputting the indication comprises outputting the indication for every discrete zoom level of the plurality of discrete zoom levels that is reached by the request.

8. The method of claim 1, wherein outputting the indication comprises outputting at least one of a physical indication, an audio indication, and a visual indication to alert the user when the request reaches the one or more discrete zoom levels.

9. The method of claim 8, wherein outputting the physical indication comprises vibrating the device.

10. The method of claim 8, wherein outputting the audio indication comprises outputting a sound when the request reaches the one or more discrete zoom levels.

11. The method of claim 8, wherein outputting the visual indication comprises outputting at least one of one or more magnification factors of the one or more discrete zoom levels, and changing a color of the touch-sensitive surface of the device that displays the image content.

12. The method of claim 1, wherein the stored version of the image content that is zoomed in or zoomed out to that magnification factor is stored in an external server.

13. A computer-readable storage medium comprising instructions that cause one or more processors to:
receive a multi-touch gesture input comprising a request to zoom in or zoom out of image content that is displayed using a touch-sensitive surface of a device;
determine, during receipt of the multi-touch gesture input using the touch-sensitive surface, whether the request to zoom in or zoom out of the image content has reached one or more discrete zoom levels of a plurality of discrete zoom levels, wherein the one or more discrete zoom levels are between a maximum and a minimum zoom boundary for displaying the image content, and wherein each one of the one or more discrete zoom levels comprises a magnification factor for a stored version of the image content that is zoomed in or zoomed out to that magnification factor; and
output, by the device, an indication to alert a user when the request reaches the one or more discrete zoom levels.

14. The computer-readable storage medium of claim 13, further comprising instructions that cause the one or more processors to:
determine one or more magnification factors during the receipt of the request; and
determine whether the one or more magnification factors correspond to the one or more discrete zoom levels,
wherein the instructions that cause the one or more processors to output the indication comprise instructions that cause the one or more processors to output the indication when the request reaches the one or more discrete zoom levels based on the determination of whether the one or more magnification factors correspond to the one or more discrete zoom levels.

15. The computer-readable storage medium of claim 14, wherein the instructions that cause the one or more processors to determine the one or more magnification factors during receipt of the request comprise instructions that cause the one or more processors to determine the one or more magnification factors during increments of the request.

16. The computer-readable storage medium of claim 14, further comprising instructions that cause the one or more processors to:
determine a distance traversed by the multi-touch gesture input,
wherein the instructions that cause the one or more processors to determine the one or more magnification factors during the receipt of the request comprise instructions that cause the one or more processors to determine the one or more magnification factors during receipt of the request based on the distance traversed by the multi-touch gesture input.

17. The computer-readable storage medium of claim 16, wherein the instructions that cause the one or more processors to determine the distance traversed by the multi-touch gesture input comprise instructions that cause the one or more processors to determine a distance that two fingers moved in providing the multi-touch gesture input.

18. The computer-readable storage medium of claim 13, wherein the instructions that cause the one or more processors to receive the request to zoom in or zoom out of image content comprise instructions that cause the one or more processors to receive the request to zoom in or zoom out of image content with a two-finger touch technique.

19. The computer-readable storage medium of claim 13, wherein the instructions that cause the one or more processors to output the indication comprise instructions that cause the one or more processors to output the indication for every discrete zoom level of the plurality of discrete zoom levels that is reached by the request.

20. The computer-readable storage medium of claim 13, wherein the instructions that cause the one or more processors to output the indication comprise instructions that cause the one or more processors to output at least one of a physical indication, an audio indication, and a visual indication to alert the user when the request reaches the one or more discrete zoom levels.

21. The computer-readable storage medium of claim 20, wherein the instructions that cause the one or more processors to output the physical indication comprise instructions that cause the one or more processors to vibrate the device.

22. The computer-readable storage medium of claim 20, wherein the instructions that cause the one or more processors to output the audio indication comprise instructions that cause the one or more processors to output a sound when the request reaches the one or more discrete zoom levels.

23. The computer-readable storage medium of claim 20, wherein the instructions that cause the one or more processors to output the visual indication comprise instructions that cause the one or more processors to output at least one of one or more magnification factors of the one or more discrete zoom levels, and changing a color of the touch-sensitive surface of the device that displays the image content.

24. The computer-readable storage medium of claim 13, wherein the stored version of the image content that is zoomed in or zoomed out to that magnification factor is stored in an external server.

25. A device comprising:
a touch-sensitive surface that receives a multi-touch gesture input comprising a request to zoom in or zoom out of image content that is displayed using a touch-sensitive surface of the device;
means for determining, during receipt of the multi-touch gesture input using the touch-sensitive surface, whether the request to zoom in or zoom out of the image content has reached one or more discrete zoom levels of a plurality of discrete zoom levels, wherein the one or more discrete zoom levels are between a maximum and a minimum zoom boundary for displaying the image content, and wherein each one of the one or more discrete zoom levels comprises a magnification factor for a stored version of the image content that is zoomed in or zoomed out to that magnification factor; and
one or more processors that output an indication to alert a user when the request reaches the one or more discrete zoom levels.

* * * * *